United States Patent
Kleine et al.

(10) Patent No.: US 11,397,611 B2
(45) Date of Patent: Jul. 26, 2022

(54) PREDICTIVE SCHEDULING OF COMPUTING TASKS

(71) Applicant: Optum Services (Ireland) Limited, Dublin (IE)

(72) Inventors: Hendrik Kleine, Dublin (IE); Vicente Rubén Del Pino Ruiz, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 379 days.

(21) Appl. No.: 16/597,802

(22) Filed: Oct. 9, 2019

(65) Prior Publication Data

US 2021/0109779 A1 Apr. 15, 2021

(51) Int. Cl.
G06F 9/48 (2006.01)
G06N 3/08 (2006.01)

(52) U.S. Cl.
CPC ............ G06F 9/4881 (2013.01); G06N 3/08 (2013.01)

(58) Field of Classification Search
None
See application file for complete search history.

(56) References Cited

U.S. PATENT DOCUMENTS

| | | | |
|---|---|---|---|
| 6,366,915 B1 * | 4/2002 | Rubert | G06F 21/6218 707/770 |
| 9,720,738 B2 | 8/2017 | Anghel et al. | |
| 9,965,725 B1 | 5/2018 | Levchuk et al. | |
| 10,168,953 B1 | 1/2019 | Gupta et al. | |
| 2005/0198196 A1 * | 9/2005 | Bohn | H04L 67/34 709/217 |
| 2006/0156307 A1 * | 7/2006 | Kunjithapatham | H04L 12/2803 718/103 |
| 2010/0262653 A1 * | 10/2010 | Chaffee | G06Q 10/10 715/853 |
| 2011/0197196 A1 * | 8/2011 | Felton | G06F 9/4856 718/104 |
| 2014/0200949 A1 * | 7/2014 | Perry | G06Q 10/06316 705/7.26 |
| 2014/0229221 A1 * | 8/2014 | Shih | G06F 9/5038 705/7.23 |

(Continued)

OTHER PUBLICATIONS

Peng et al., "Random Task Scheduling Scheme Based on Reinforcement Learning in Cloud Computing," Cluster Computing, vol. 18, No. 4, Sep. 2015, 14 pp.

(Continued)

*Primary Examiner* — Hiren P Patel
(74) *Attorney, Agent, or Firm* — Shumaker & Sieffert, P.A.

(57) ABSTRACT

For each computing task of a plurality of computing tasks, a computing system is configured to apply a machine learning process that determines an expected usage time for output data associated with the computing task. Execution of the computing task generates the output data associated with the computing task. The expected usage time for the output data associated with the computing task is a time at which a user associated with the computing task can be expected to access the output data associated with the computing task. The computing system is configured to schedule execution of one or more of the computing tasks such that expected times of completion of the one or more computing tasks are prior to the expected usage times for the one or more computing tasks.

16 Claims, 9 Drawing Sheets

(56) References Cited

U.S. PATENT DOCUMENTS

| | | | | |
|---|---|---|---|---|
| 2015/0269508 | A1* | 9/2015 | Damboritz | G06Q 10/06311 705/2 |
| 2016/0086140 | A1* | 3/2016 | Sumioka | G06Q 10/063112 705/7.14 |
| 2016/0124770 | A1* | 5/2016 | Bouchard | G06N 7/005 718/103 |
| 2016/0171008 | A1* | 6/2016 | Ciabrini | G06F 16/24552 707/609 |
| 2018/0349474 | A1* | 12/2018 | Smith | G06Q 10/06 |
| 2019/0279138 | A1* | 9/2019 | Koga | G06Q 10/063114 |
| 2020/0210483 | A1* | 7/2020 | Gujarathi | G06F 16/9035 |
| 2020/0226141 | A1* | 7/2020 | Pandey | G06N 5/048 |

OTHER PUBLICATIONS

Gervasio et al., "Learning to Predict User Operations for Adaptive Scheduling," Proceedings of the American Association for Artificial Intelligence-98, 1998, 1998 (Applicant points out, in accordance with MPEP 609 04(a), that the year of publication, 1998, is sufficiently earlier than the effective U.S. filing date, so that the particular month of publication is not in issue.) 6 pp.

Berral et al., "Adaptive Scheduling on Power-Aware Managed Data-Centers using Machine Learning," Proceedings of the 12th IEEE/ACM International Conference on Grid Computing 2011, Sep. 1, 2011, 11 pp.

Chen et al., "Predictive Analysis by Leveraging Temporal User Behavior and User Embeddings," CIKM '18 Proceedings of the 27th ACM International Conference on Information and Knowledge Management, Oct. 2018, 8 pp.

Neagu et al., "How to Create Advanced Tasks with the Task Scheduler," Digital Citizen, Dec. 3, 2018, 15 pp.

International Search Report and Written Opinion of International Application No. PCT/IB2020/059526, dated Jan. 15, 2021, 26 pp.

* cited by examiner

PREDICTIVE SCHEDULING OF COMPUTING TASKS

TECHNICAL FIELD

This disclosure relates to computing systems.

BACKGROUND

Computing systems may be configured to perform a wide variety of computing tasks. For example, a computing system may be configured to perform computing tasks to generate various types of report data. Because the computing tasks may be complex, it may be impractical to perform the computing tasks in real-time in response to user requests for the report data. For instance, it may take several seconds or more to complete a single computing task. Accordingly, users may configure the computing system to perform the computing tasks so that the report data generated by performing the computing tasks is ready before the users need to the report data. In other words, a schedule may be established for performance of computing tasks on the computing system.

SUMMARY

This disclosure describes techniques for scheduling of computing tasks on a computing system. As described herein, a computing system may be configured to perform a set of computing tasks. For each of the computing tasks, the computing system may obtain user usage data for the computing task. The user usage data for a computing task may include data that indicate one or more times at which users associated with the computing task access output data associated with the computing task. Furthermore, in accordance with the techniques of this disclosure, the computing system may apply a machine learning process that determines, based on the user usage data for the computing tasks, times at which the users associated with the computing task can be expected to access the output data associated with the computing task. The computing system may schedule execution of the computing task such that an expected time of completion of the computing task is prior to the time at which the users associated with the computing task are expected to access the output data associated with the computing task.

In one example, this disclosure describes a method of scheduling a plurality of computing tasks for performance by a computing system, the method comprising: for each computing task of the plurality of computing tasks: applying, by the computing system, a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determining, by the computing system, a start time for the computing task that is prior to the expected usage time for the computing task by at least an expected running time of the computing task; and scheduling, by the computing system, execution of one or more of the computing tasks at the determined start times for the computing tasks.

In another example, this disclosure describes a computing system comprising: one or more processing circuits configured to: for each computing task of a plurality of computing tasks: apply a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determine a start time for the computing task that is prior to the expected usage time for the computing task by at least an expected running time of the computing task; and schedule execution of one or more of the computing tasks at the determined start times for the computing tasks; and one or more storage devices configured to store an output data repository that includes output data associated with the one or more computing tasks.

In another example, this disclosure describes a computer-readable data storage medium having instructions stored thereon that, when executed cause a computing system to: for each computing task of a plurality of computing tasks: apply a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determine a start time for the computing task that is prior to the expected usage time for the computing task by at least an expected running time of the computing task; and schedule execution of one or more of the computing tasks at the determined start times for the computing tasks.

In another example, this disclosure describes a computing system comprising: for each computing task of a plurality of computing tasks: means for applying a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and means for determining a start time for the computing task that is prior to the expected usage time for the computing task by at least an expected running time of the computing task; and means for scheduling execution of one or more of the computing tasks at the determined start times for the computing tasks; and means for storing an output data repository that includes output data associated with the one or more computing tasks.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
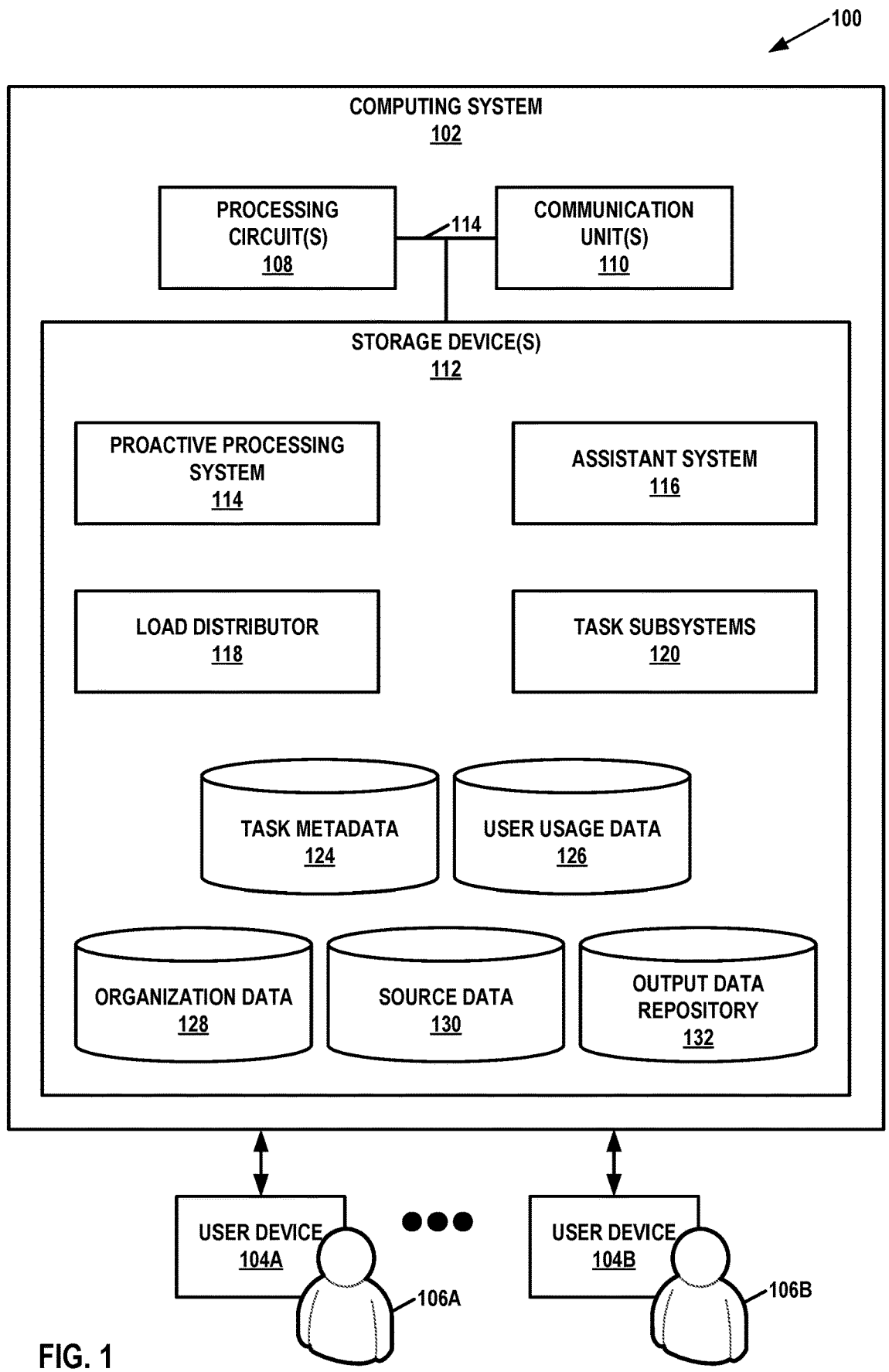
FIG. 1 is a block diagram illustrating an example system in accordance with one or more aspects of this disclosure.

According to conventional techniques for scheduling computing tasks, a computing system may be configured to perform the computing tasks according to a predetermined schedule. For example, the predetermined schedule may specify that the computing system is to perform a first computing task starting at 5:00 am each weekday and that the computing system is to perform a second computing task starting at 5:30 am each weekday. Thus, in this example, both the output data generated by the first and second computing tasks may be available by the time users typically access the output data generated by the first and second computing tasks. Examples of output data may include tabular reports, visual reports, dashboard data, and so on. It has typically been understood that it is advantageous to schedule long-running computing tasks at night to avoid overconsumption of resources of the computing system during working hours.

However, in some industries, the volumes of data processed by certain computing tasks is growing at an exponential rate while data processing capabilities of computing systems grows at a slower rate. Hence, when each computing task needs to process more data using the same computing resources, the time to completion of the computing task may slow down. Thus, simply scheduling computing tasks at night may not be an adequate solution to the problem of how to ensure timely availability of output data generated by computing tasks.

Prior attempts to address this problem each have shortcomings. For example, caching is a technique in which a computing system stores subsets of data so that future requests for the same data can be satisfied faster. However, caches typically have limited space and, as a result, can only be used to store limited amounts of output data. Furthermore, caching may be an inefficient use of resources because the cache may store output data generated by computing tasks regardless of whether the output data will actually be used. Another potential drawback of caching is that caching typically operates on a first-in-first-out basis. That is, when storage space in the cache is full, the computing system typically replaces the oldest data in the cache to free up space for new data. However, if a subsequent computing task wanted to access the replaced data, the computing system may need to run a computing task again to regenerate the replaced data. Another potential drawback of caching may occur when the cache is not proactively cleaned. That is, data that is no longer used may remain stored in the cache, thereby using valuable caching resources.

Pre-warming is another example of an attempt to address the problem of ensuring timely availability of output data. When a computing system uses pre-warming, the computing system stores a subset of the output data so that certain requests for the output data can be satisfied faster. The subset may be user defined, defined statistically based on user data, or define in another way. However, pre-warming is limited to a predefined subset of the output data, which may require manual input to specify the subset. Additionally, pre-warming does not prioritize the requirements of particular individual user's requirements. Moreover, pre-warming does not provide any benefit in the context of ad-hoc execution of computing tasks because no output data is stored for such computing tasks.

Aggregation is another example of an attempt to address the problem of ensuring timely availability of output data. When a computing system uses aggregation, the computing system may transform data into a reduced or "rolled-up" subset, which may enable the computing system to satisfy requests faster. However, like pre-warming, aggregation may be limited to a predefined subset of data, which may require manual input to specify the subset. Additionally, aggregation may limit some uses of the output data by removing detailed data.

Subscription is another example of an attempt to address the problem of ensuring timely availability of output data. When a computing system uses a subscription model, the computing system may generate output data and notify users (i.e., subscribers) when the output data is ready. However, problems with subscription models may include difficulty in manage subscriptions, causing peak workloads due to requests not being distributed over time, and lack of information about usage of the output data.

In-memory storage of output data is another example of an attempt to address the problem of ensuring timely availability of output data. When a computing system uses in-memory storage of output data, the computing system may store data on fast-read hardware. As a result, requests may be satisfied faster. However, fast-read hardware may have limited space and, as a result, cannot benefit all computing tasks. Additionally, in-memory storage of output data may require synchronization between a source database and an in-memory database. In-memory storage of output data may also cause an inefficient use of hardware because the output data may be accessed infrequently but the output still remains in the fast-read memory.

In addition to the problems mentioned above, there are a number of problems with the conventional techniques for scheduling computing tasks. For example, a computing system may perform a computing task according to the predetermined scheduled, but no users actually access the output data associated with the computing task. For instance, the users associated with the computing system may have left the company or are simply no longer interested in the output data associated with the computing task. Nevertheless, such users might not inform administrators of the computing system that they no longer need the output data associated with the computing task. Thus, in this example, the computing resources of the computing system that were allocated for performance of the computing task may go to waste. For instance, the electrical energy that the computing system consumed during performance of the computing task was not used to provide real benefit to any person. Moreover, in some situations, the computing resources allocated to performance of the computing task could have been used to perform a different computing task to generate output data that is used by a person. In another example, computing system 102 may be implemented on a cloud-based computing service, such as Amazon Web Services or Microsoft Azure™. In this example, avoiding performance of unnecessary computing tasks may help reduce costs of an organization that uses the cloud-based computing service.

Another drawback to scheduled data processing is that users in charge of setting the schedule often do not have oversight over all other scheduled processes and may schedule their processing task during the same time-window as many other tasks. Similarly, data processing tasks are typically scheduled in the early morning, so that users may enjoy the latest information at the start of their workday. The problem here is that executing multiple computing tasks during the same timeframe requires more computing resources than if the computing tasks were distributed throughout the day.

The techniques of this disclosure may address these problems. For instance, in accordance with the techniques of this disclosure, the computing system may apply a machine learning process that determines a time at which a user associated with the computing task can be expected to access the output data associated with the computing task. The computing system may schedule execution of the computing task such that an expected time of completion of the computing task is prior to the time at which the user associated with the computing task is expected to access the output data associated with the computing task. The output data associated with a computing task may be (or, in some examples, may be based on) data generated by executing the computing task.

It is noted that a user may not ever access output data of a scheduled computing task and even if the user does access the output data associated with the computing task, the time at which the user accesses the output data associated with the computing data may change over time. Hence, it may be inefficient for the computing system to perform the computing task at a time indicated by a manually defined schedule. By applying one or more examples of the machine learning processes described in this disclosure to determine the times at which users associated with a computing task can be expected to access the output data associated with the computing task and scheduling the computing task for completion prior to the expected usage time of the output data of the computing task, the computing system may avoid unnecessary use of computing resources of the computing system or temporally distribute execution of computing tasks.

Moreover, in some examples, the computing system may determine that it is unlikely that any user will access the output data of a computing task. Thus, in this situation, the computing system may skip scheduling of the computing task, thereby avoiding the use of computing resources associated with performing the computing task. Avoiding unnecessary use of computing resources of the computing system may reduce power consumption of the computing system or increase the availability of computing resources of the computing system for other computing tasks.

FIG. 1 is a block diagram illustrating an example system 100 in accordance with one or more aspects of this disclosure. In the example of FIG. 1, system 100 includes a computing system 102 and a set of one or more user devices 104A through 104N. This disclosure may refer to user devices 104A through 104N collectively as "user devices 104." Users 106A through 106N may use user devices 104. This disclosure may refer to users 106A through 106N collectively as "users 106." In other examples, system 100 may include more, fewer, or different components. Although users 106 are depicted in the example of FIG. 1 only as a people, the term "user" in this disclosure may refer in various examples to people and/or computing systems (e.g., software applications or devices). Thus, this disclosure may apply the term "user" in the sense of something or someone that uses data generated by a computing task.

Computing system 102 may include one or more computing devices. In examples where computing system 102 includes two or more computing devices, the computing devices of computing system 102 may act together as a system. Example types of computing devices include server devices, personal computers, handheld computers, intermediate network devices, data storage devices, and so on. In examples where computing system 102 includes two or more computing devices, the computing devices of computing system 102 may be geographically distributed or concentrated together, e.g., in a single data center. Computing system 102 may be operated by or on behalf of various types of organizations, enterprises, or individuals. Each of user devices 104 may be a computing device, such as a mobile telephone, tablet, personal computer, wearable device, or other type of computing device.

Computing system 102 and user devices 104 may communicate via one or more communication networks. For instance, in some examples, computing system 102 and user devices 104 may communicate via a wide area network, such as the Internet. The communication networks may include one or more wireless or wire-based communication links.

As shown in the example of FIG. 1, computing system 102 includes one or more processing circuits(s) 108, one or more communication unit(s) 110, one or more storage device(s) 112, and one or more communication channels 114. Computing system 102 may include other components. For example, computing system 102 may include input devices, output devices, display screens, a power source, and so on. Communication channel(s) 114 may interconnect each of components 108, 110, and 112 for inter-component communications (physically, communicatively, and/or operatively). In some examples, communication channel(s) 114 may include a system bus, a network connection, an inter-process communication data structure, or any other method for communicating data. Storage device(s) 112 may store information required for use during operation of computing system 102.

Processing circuits(s) 108 comprise circuitry configured to perform processing functions. For instance, one or more of processing circuits(s) 108 may be a microprocessor, application-specific integrated circuit (ASIC), field-programmable gate array (FPGA), or another type of processing circuit. In some examples, processing circuits(s) 108 of computing system 102 read and may execute instructions stored by storage device(s) 112.

Communication unit(s) 110 may enable computing system 102 to send data to and receive data from one or more other computing devices (e.g., via a communications network, such as a local area network or the Internet). For instance, communication unit(s) 110 may be configured to receive and send task metadata, user usage data, output data, and other types of data. In some examples, communication unit(s) 110 may include wireless transmitters and receivers that enable computing system 102 to communicate wirelessly with the other computing devices. Examples of communication unit(s) 110 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit(s) 110 to communicate with one or more other computing devices or systems, such as user devices 104 (FIG. 1).

Storage device(s) 112 may be implemented using one or more types of devices for storing data. For example, one or more of storage device(s) 112 may be implemented using hard disk drives, solid state drives, random access memory (RAM), or other types of non-transitory computer-readable media. Storage device(s) 112 may store computer-executable instructions, such as programs or scripts. Processing circuits(s) 108 may read instructions from storage device(s) 112 and may execute instructions stored by storage device(s) 112. Execution of the instructions by processing circuit(s) 108 may configure or cause computing system 102 to provide at least some of the functionality ascribed in this disclosure to computing system 102.

In the example of FIG. 1, storage device(s) 112 store computer-executable instructions for implementing a proactive processing system 114, an assistant system 116, a load distributor 118, and a set of task subsystems 120. In other examples, one or more aspects or functions of proactive processing system 114, assistant system 116, load distributor 118, and task subsystems 120 may be implemented using special-purpose processing hardware, such as application-specific integrated circuits (ASICs). For ease of explanation, rather than describing processing circuits or special-purpose processing hardware performing the functions of proactive processing system 114, assistant system 116, load distributor 118, and task subsystems 120, this disclosure simply describes proactive processing system 114, assistant system 116, load distributor 118, and task subsystems 120 as performing such functions. However, it should be understood that the functions of proactive processing system 114, assistant system 116, load distributor 118, and task subsystems 120 may be performed by fixed-function circuitry, programmable circuitry, or a combination of fixed-function and programmable circuitry.

Proactive processing system 114 may selectively perform computing tasks that generate output data that is anticipated to be required by a user or group of users. In some examples, proactive processing system 114 may proactively distribute time slots in which computing resources of computing system 102 are idle or not used for required computing tasks. In other words, proactive processing system 114 may distribute time slots without explicit, manual human involvement in selecting the time slots. Proactive processing system 114 may proactively generate predictions regarding which user or users, if any, are going to use output data, and from which computing tasks, within particular time windows. In examples where the output data generated by computing tasks performed by computing system 102 comprises business insight data, proactive processing system 114 may be referred to as a "proactive insights processor." Examples of output data involving the health insurance industry may include an analysis of the number of claims of a hospital, an amount billed by a hospital, claim limits for a hospital, an analysis of claim disputes, trending of budget utilization and revenue realization, or other types of data.

Assistant system 116 may detect instances in which proactive processing system 108 predicted that a user would access output data generated by specific computing tasks within specific time windows but did not. To proactively provide the output data to such users, assistant system 116 may detect a combination of users, output data, and time windows, and proactively deliver the output data for the users. In some examples, assistant system 116 may send notifications to the users to indicate that the output data is ready to be delivered to the users. In examples where the output data generated by computing tasks performed by computing system 102 comprises business insight data, assistant system 116 may be referred to as a "smart insights assistant."

Load distributor 118 may detect surges in demand for output data and may distribute performance of computing tasks to idle time. Thus, if proactive processing system 114 determines that a large number of computing tasks are to be completed before a particular time, load distributor 118 may temporally distribute the processing of these computing tasks so that computing system 102 does not need to attempt to perform all of the computing tasks at one time. Task subsystems 120 include systems that are used by one or more of proactive processing system 114, assistant system 116, and load distributor 118.

In the example of FIG. 1, storage device(s) 112 may store and/or access various types of data (e.g., data in addition to instructions for proactive processing system 114, assistant system 116, load distributor 118, and task subsystems 120). For instance, in the example of FIG. 1, storage device(s) 112 may store and/or access task metadata 124, user usage data 126, organization data 128, source data 130, and output data repository 132. In other examples, computing system 102 may store and/or access more, fewer, or different types of data.

A computing task is a set of one or more computer programs that generate output data. Different computing tasks may generate different output data. In some examples, the output data generated by a computing task includes business insight data, scientific data, governmental data, or other types of data.

Task metadata 124 includes task metadata for one or more computing tasks. The task metadata 124 for a computing task may indicate one or more users associated with the computing task. A user associated with a computing task may be a person or system that has been registered to receive the output data generated by the computing task. In some examples, task metadata 124 may be referred to as subscription information. In some examples, the subscription information may specify times and/or a schedule for providing output data associated with the computing task to the user.

User usage data 126 includes data regarding which users access output data generated by computing tasks, and when. For example, user usage data 126 may include an entry that specifies that user X accessed output data associated with computing task Y at time Z.

Organization data 128 includes data describing relationships among people within an organization. For example, in an organization (e.g., a business enterprise or governmental entity) may be organized into a hierarchy and organization data 128 may indicate the roles of specific people within the hierarchy. For instance, in one example, organization data 128 may indicate that person X is the CEO, that person Y reports to person X, that person Z reports to person Y, and so on.

As shown in the example of FIG. 1, storage device(s) 112 store source data 130 and output data repository 132. Computing tasks use source data 130 as input data. Source data 130 may include a wide variety of data. For example, source data 130 may include business data, scientific data, engineering data, governmental data, demographic data, and so on. Output data repository 132 includes output data generated by executing computing tasks.

As described in this disclosure, proactive processing system 114 may obtain task metadata 124 for the plurality of computing tasks. For each of the computing tasks, the task metadata 124 for the computing task indicates one or more users associated with the computing task. The task metadata 124 for the computing task may also indicate one or more computer programs to execute the computing task. For example, the task metadata 124 for the computing task may indicate a filename of an executable file that comprises instructions for executing the computing task. In another example, the task metadata 124 for the computing task may indicate a Uniform Resource Locator (URL) specifying a location of a program to execute the computing task. Execution of the computing task generates output data associated with the computing task.

For each of the computing tasks, proactive processing system 114 may obtain user usage data 126 for the computing task. For example, proactive processing system 114 may retrieve user usage data 126 from storage device(s) 112. The user usage data 126 for the computing task includes data that indicate one or more times at which the user associated with the computing task accesses the output data associated with the computing task. Additionally, in some examples, the user usage data 126 for the computing task may indicate a duration of time that the user spent viewing the output data associated with the computing task.

Proactive processing system 108 may apply a machine learning process that determines an expected usage time for the computing task. The expected usage time for the computing task is a time at which the user associated with the computing task can be expected to access the output data associated with the computing task. The machine learning process may determine the expected usage time for the computing task based on the user usage data 118 for the computing task. Computing system 102 (e.g., proactive processing system 114, assistant system 116, load distributor 118 of computing system 102) may schedule execution of the computing task such that an expected time of completion of the computing task is prior to the expected usage time for the computing task.

In some examples, to determine the expected time of completion of a computing task, computing system 102 may determine an expected running time of the computing task. For example, computing system 102 may determine the expected running time of the computing task based on an average of the lengths of time historically used to complete execution of the computing task on the computing infrastructure of computing system 102. In other examples, computing system 102 may determine the expected running time of the computing task by extrapolating a running time of the computing task based on lengths of time historically used to complete execution of the computing task on the computing infrastructure of computing system 102. Furthermore, computing system 102 may determine a starting time for the computing task such that the starting time plus the expected running time of the computing task is still before the expected usage time for the computing task.

Computing system 102 may provide the output data to one or more of user devices 104. For example, computing system 102 may store the output data in output data repository 132 for retrieval by one or more of user devices 104. As described elsewhere in this disclosure, computing system 102, may provide the output data to one of user devices 104 by sending the output data within or attached to messages, such as email messages or chat room messages, retrieved by user devices 104.

Figure 2:
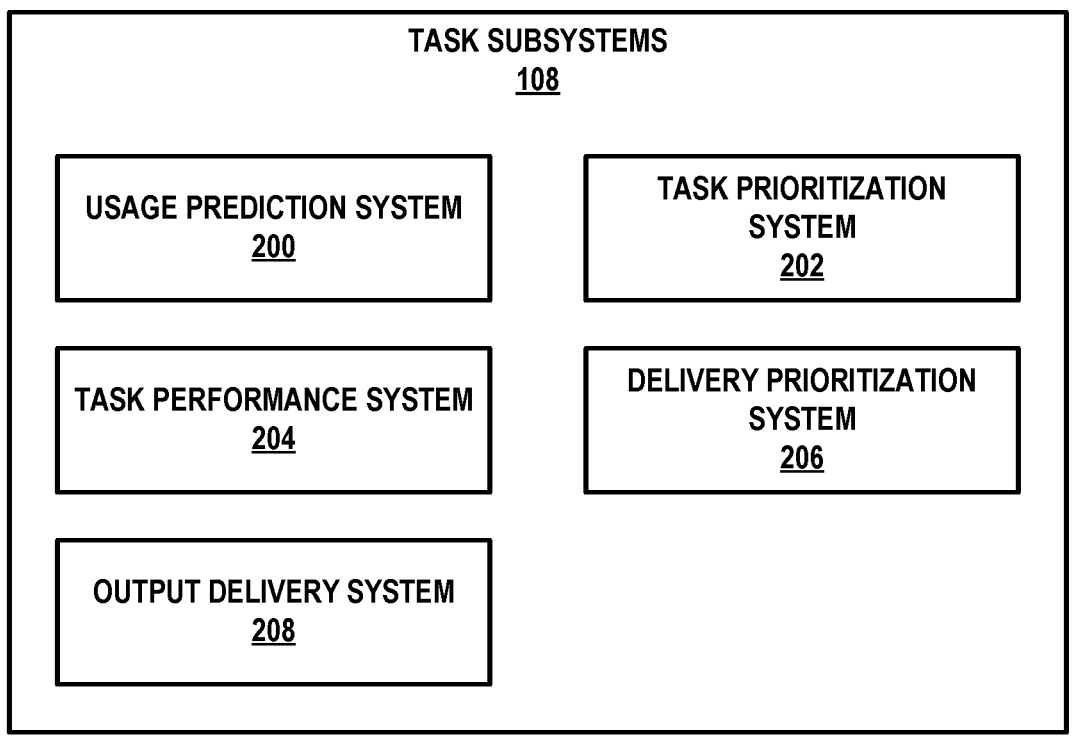
FIG. 2 is a block diagram illustrating an example set of task subsystems, in accordance with one or more aspects of this disclosure.

FIG. 2 is a block diagram illustrating an example set of task subsystems 120, in accordance with one or more aspects of this disclosure. In the example of FIG. 2, task subsystems 120 includes a usage prediction system 200, a task prioritization system 202, a task performance system 204, a delivery prioritization system 206, and an output delivery system 208. Usage prediction system 200, task prioritization system 202, task performance system 204, delivery prioritization system 206, and output delivery system 208 are functional components of computing system 102. In some examples, usage prediction system 200, task prioritization system 202, task performance system 204, delivery prioritization system 206, and/or output delivery system 208 are implemented as distinct software systems or modules. In other examples, usage prediction system 200, task prioritization system 202, task performance system 204, delivery prioritization system 206, and/or output delivery system 208 are not implemented as distinct software systems or modules but are implemented as fixed-function hardware components or a combination of software and hardware components. In examples where the output data generated by computing tasks performed by computing system 102 comprises business insight data, usage prediction system 200 may be referred to as an "insights usage predictor," task prioritization system 202 may be referred to as an "assert prioritization engine," and task performance system 204 may be referred to as an "insights processor."

Figure 3:
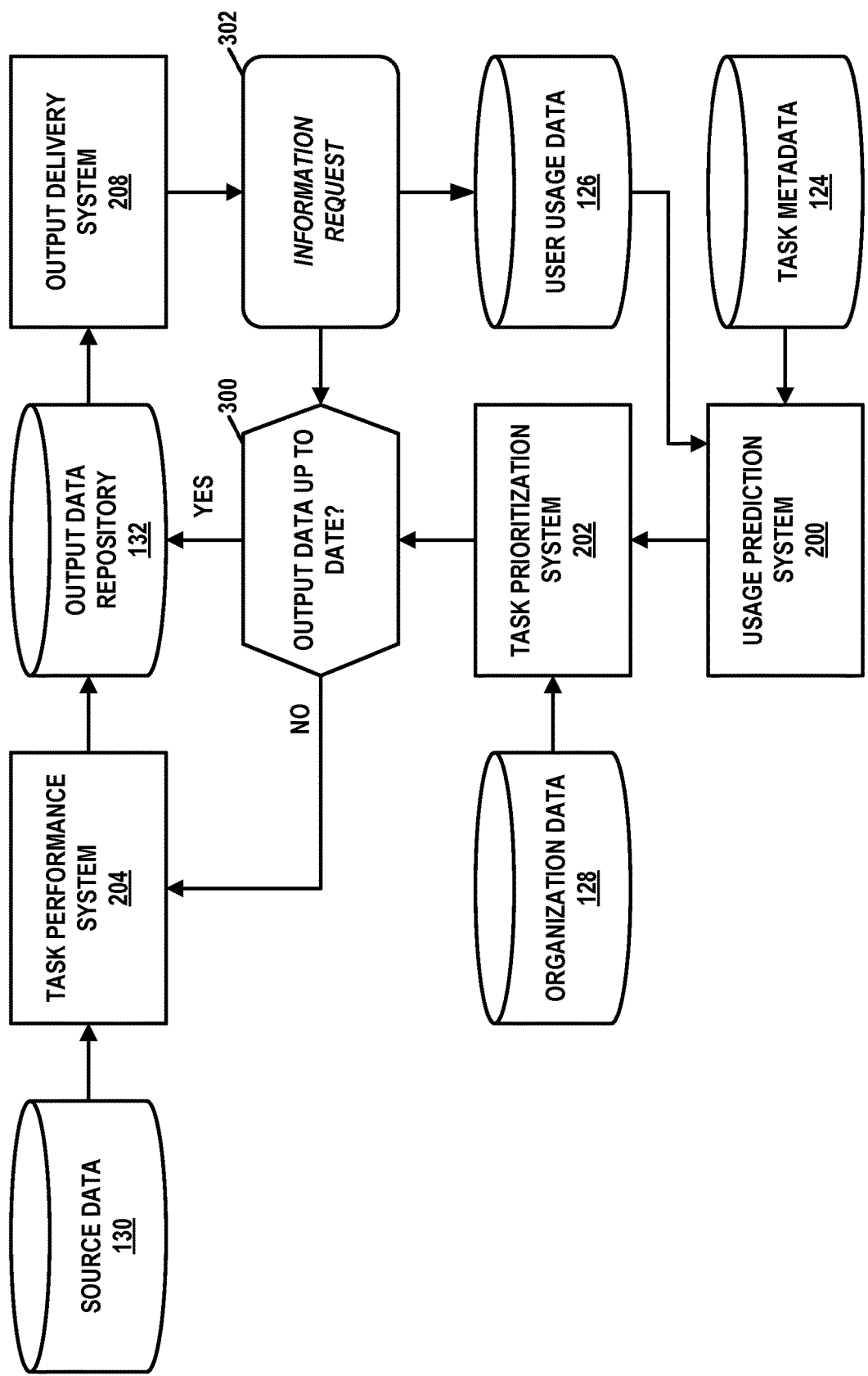
FIG. 3 is a block diagram illustrating an example operation of a proactive processing system, in accordance with one or more aspects of this disclosure.

In general terms, usage prediction system 200 predicts times when specific users are likely to review output data generated by specific computing tasks. Additionally, usage prediction system 200 may ensure that the output data generated by a specific computing task is generated and available for retrieval with as little latency as possible. Usage prediction system 200 may generate a task list. Entries in the task list may specify a computing task, one or more users, and a predicted time when the users are likely to review the output data generated by the computing tasks. FIG. 3, which is described in greater detail elsewhere in this disclosure, describes an example operation of proactive processing system 114 in which usage prediction system 200 generates a task list.

Figure 4:
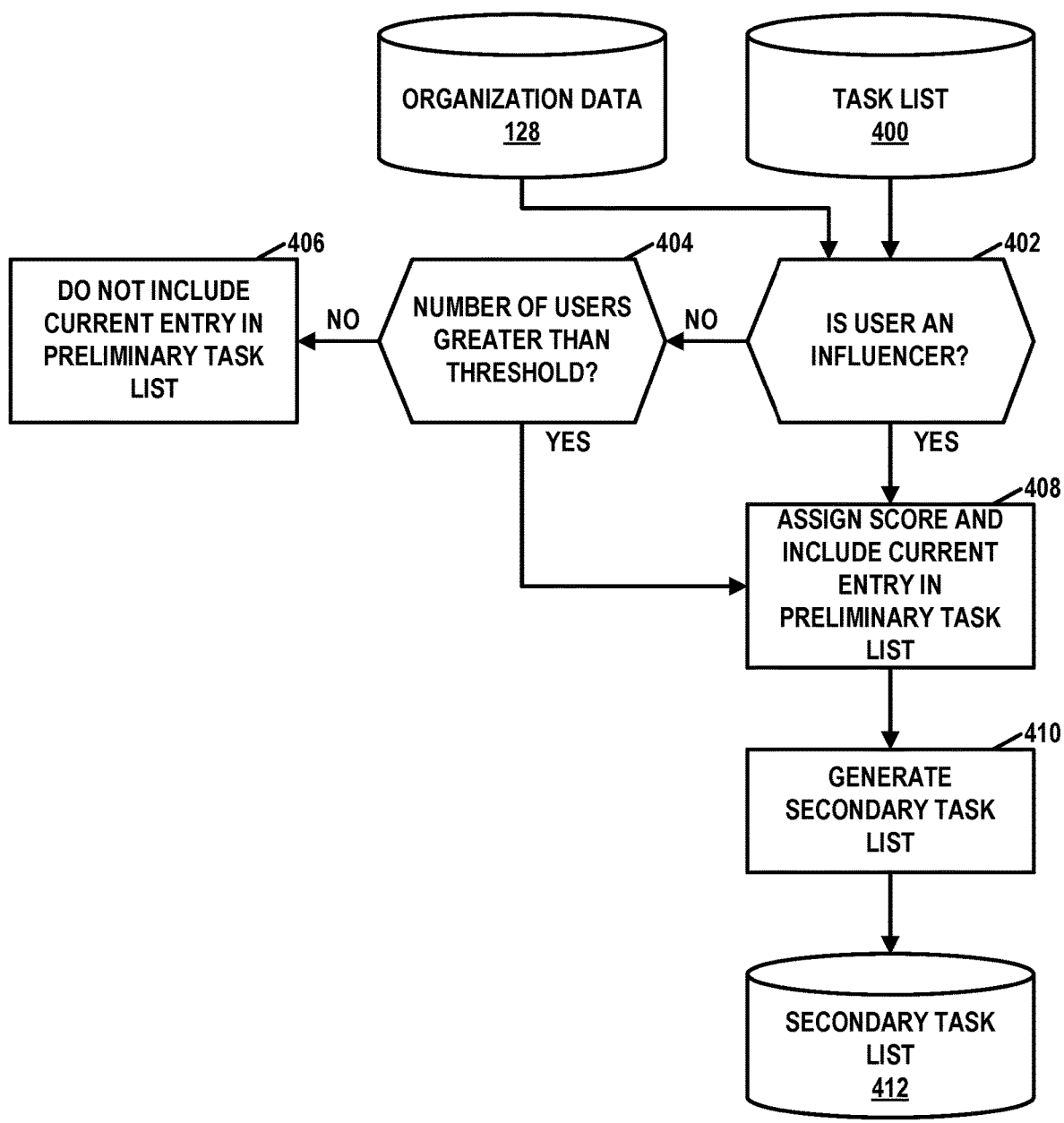
FIG. 4 is a block diagram illustrating an example operation of a task prioritization system, in accordance with one or more aspects of this disclosure.

Task prioritization system 202 prioritizes entries in the task list generated by the usage prediction system 200. For example, task prioritization system 202 may filter the task list to ensure that computing system 102 preferentially generates output data deemed to be higher priority than output data deemed to have lesser priority. For instance, task prioritization system 202 may generate a filtered list of one or more computing tasks based on roles of users associated with the computing tasks, where the filtered list may include fewer than all of the computing tasks. In this example, computing system 102 may schedule execution of the computing tasks in the filtered list. FIG. 4, which is described greater detail elsewhere in this disclosure, describes a process for prioritizing entries in the task list.

Task prioritization system 202 may schedule execution of computing tasks in the filtered list such that each of the computing tasks has an expected time of completion prior to the expected usage times for the computing tasks. For instance, task prioritization system 202 may determine expected amounts of time to perform the computing tasks (i.e., expected running times for the computing tasks). Task prioritization system 202 may allocate time windows to the computing tasks. The time windows may have lengths based on the expected amounts of times to perform the computing tasks. Task prioritization system 202 may allocate the time windows to ensure that, for each of the computing tasks, the time window allocated to the computing task ends before the expected usage time for the computing task.

Task performance system 204 is responsible for performing computing tasks. For example, task performance system 204 may provide an execution environment for the computing tasks. Task performance system 204 may initiate execution of computing tasks that are in the task list according to an order of the computing tasks in the task list.

Delivery prioritization system 206 may check combinations of users, output data, and predicted time slots and compare the combinations against a per-user threshold. The per-user threshold may be customizable. As described in greater detail elsewhere in this disclosure, if the computing task generates output data during a predicted time slot (i.e., during a time slot prior to a time when a user associated with the computing task is predicted to access the output data generated by the computing task) and if the user associated with the computing task does not retrieve the output data generated by the computing task from output data repository 132 prior to an elapsed time exceeding the per-user threshold, delivery prioritization system 206 may notify the user. The elapsed time may begin at the time when the user associated with the computing task is predicted to access the output data generated by the computing task.

Delivery prioritization system 206 may notify the user in one or more of various ways. For example, delivery prioritization system 206 may send an email message, a chatroom message, an instant message, an app-based notification, a telephonic voice message, or another type of notification to the user. In some examples, delivery prioritization system 206 includes a copy of the output data generated by the computing task in the notification or another message and removes the output data from output data repository 132. In some examples, a notification sent by delivery prioritization system 206 indicates a time when (or a remaining amount of time before when) delivery prioritization system 206 removes the output data from output data repository 132.

Removing the output data from output data repository 132 may increase the amount of available storage space in output data repository 132. Thus, it may be less common that physical hardware for storage of output data repository 132 needs to be expanded to accommodate storage of additional output data.

Furthermore, in the example of FIG. 2, output delivery system 208 implements a process to deliver output data to user devices 104. For example, output delivery system 208 may receive requests for the output data generated by specific computing tasks from user devices 104 and send responses containing the output data to user devices 104. Output delivery system 208 may receive the request and send the responses in accordance with one of a variety of communication protocols, such as hypertext transfer protocol, file transfer protocol, or another type of communication protocol.

FIG. 3 is a block diagram illustrating an example operation of proactive processing system 114, in accordance with one or more techniques of this disclosure. In the example of FIG. 3, proactive processing system 114 uses usage prediction system 200, task prioritization system 202, task performance system 204, output delivery system 208, task metadata 124, user usage data 126, organization data 128, source data 130, and output data repository 132. Other example operations of proactive processing system 114 may include more, fewer or different actions.

Specifically, in the example of FIG. 3, usage prediction system 200 uses task metadata 124 and user usage data 126 to predict an expected usage time for a computing task. The expected usage time for the computing task is a time at which a user associated with the computing task can be expected to access the output data associated with the computing task. As described in greater detail elsewhere in this disclosure, usage prediction system 200 may apply a machine learning process that determines, based on user usage data 126 for a computing task, an expected usage time for the output data associated with the computing task. Usage prediction system 200 may generate a task list that contains entries, each of which may specify a computing task, one or more users, and a predicted time (i.e., an expected usage time) when the users are likely to review the output data generated by the computing tasks.

In some examples, if there are multiple users associated with a computing task, usage prediction system 200 may predict an expected usage time for the computing task for each of the users associated with the computing task. Usage prediction system 200 may the select the earliest of the expected usage times as the expected usage time for the computing task. In other examples, usage prediction system 200 may select the expected usage time for the computing task to be before an expected usage time for the computing task for a person having a particular role (e.g., an executive at an organization).

In some examples, usage prediction system 200 may determine that there is no expected usage time for the output data associated with a computing task for any user. In other words, usage prediction system 200 may determine that no user is likely to ever use the output data associated with a specific computing task. This situation may occur, for example, when all users associated with a computing task have left a company or have moved on to different roles and no longer need the output data associated with the computing task. Accordingly, in situations where there is no expected usage time for the output data associated with a computing task, usage prediction system 200 may omit an entry specifying the computing task from the task list. In this way, usage prediction system 200 may determine, based on user usage data 126, whether or not to schedule the execution of a computing task; and furthermore may schedule the execution of the computing task based on a determination to schedule the execution of the computing task or not schedule the execution of the computing task based on a determination not to schedule execution of the computing task.

As noted elsewhere in this disclosure, usage prediction system 200 may apply a machine learning process that determines, based on user usage data 126 for a computing task, an expected usage time for the output data associated with the computing task (i.e., an expected usage time for the computing task). The machine learning process may be implemented in any of several ways. For instance, in one example, usage prediction system 200 may implement an artificial neural network. In other words, as part of applying a machine learning process that determines expected usage times for computing tasks, usage prediction system 200 may apply an artificial neural network that outputs the expected usage time for the output data associated with a computing task. In this example, the artificial neural network is trained to predict an expected usage time for a computing task given a set of input data. Example types of input data may include one or more of data indicating the computing task, data indicating a job title of a user, data indicating a workplace location of the user, data indicating a current time zone or location of the user, data indicating a number of users associated with the computing task, data indicating a volume of data generated by the specific computing task, data indicating a number of people subordinate to a user, and so on.

In examples where usage prediction system 200 implements an artificial neural network, usage prediction system 200 may train the artificial neural network using user usage data 126. For example, a training data set may include sets of input data for users and corresponding times when the users accessed output data. In this example, to train the artificial neural network, usage prediction system 200 may run a forward pass through the artificial neural network using a set of input data for a user. Usage prediction system 200 may then compare the resulting predicted time to an actual time indicated by the training data set that the user accessed the output data. Usage prediction system 200 may then apply a backpropagation technique to update weights of artificial neurons in the artificial neural network. After initial training of the artificial neural network, usage prediction system 200 may continue to train the artificial neural network by comparing a predicted time for an execution run of a computing task with actual times indicated by user usage data 126 that users accessed the output data generated by the execution run of the computing task.

Usage of a neural network to predict an expected usage time for a computing task may be especially useful when a new user becomes associated with the computing task and there is limited or no historical data regarding when the new user can be expected to access the output data associated with the computing task. For instance, if a new employee is hired and the new employee is to use the output data associated with the computing task, the neural network may predict (e.g., based on a time zone of a workplace of the new employee and/or other data) when the new employee is likely to use the output data associated with the computing task. If the time that the new employee is likely to use the output data associated with the computing task is earlier than a previous expected usage time for the computing task, usage prediction system 200 may update the expected usage time for the computing task to the earlier time.

In another example, usage prediction system 200 may use a machine learning linear regression algorithm to determine expected usage times for computing tasks. In this example, usage prediction system 200 may determine a regression function that maps output times to one or more input elements. The input elements may include one or more of the types of input data indicated in the artificial neural network example provided above. In this example, the regression algorithm determines coefficients for and input elements. Usage prediction system 200 may continue to update the coefficients of the regression function as data is added to user usage data 126. Other types of machine learning algorithms that may be used by usage prediction system 200 may include random forests, support vector machines, and so on.

In another example, usage prediction system 200 may determine the expected usage time for a computing task using a weighted average of the times indicated by user usage data 126 at which a user accessed the output data associated with the computing task. Usage prediction system 200 may continue to update the expected usage time as data is added to user usage data 126.

Furthermore, in the example of FIG. 3, task prioritization system 202 may obtain the task list and prioritize entries in the task list. For instance, task prioritization system 202 may sort, rearrange, or remove entries in the task list. One constraint found in any computing system is the memory limitations to store all output data, and output data repository is not immune to this issue. Another constraint is the processing power of computing system 102.

Thus, in the example of FIG. 3, although usage prediction system 200 may determine expected usage times for output data associated with computing tasks, usage prediction system 200 does necessarily indicate whether computing system 102 should in fact generate the output data associated with specific computing tasks at all, given resource constraints of computing system 102. Furthermore, in situations where computing system 102 has insufficient computing resources to process all of the computing tasks in the task list before the expected usage times for the output data associated with the computing tasks in the task list, usage prediction system 200 does not determine which of the computing tasks in the task list to perform and which of the computing tasks in the task list not to perform. Accordingly, task prioritization system 202 may perform a process to prioritize entries in the task list. Task prioritization system 202 may use organization data 128 to prioritize the entries in the task list. FIG. 4, which is described in greater detail elsewhere in this disclosure, describes an example process for prioritizing the entries in the task list.

Furthermore, in the example of FIG. 3, proactive processing system 114 may determine, for computing tasks listed in the task list, whether output data repository 132 already stores up-to-date output data associated with the computing task (300). Output data repository 132 may store up-to-date output data associated with a computing task if output data repository 132 stores output data associated with the computing task and performing the computing task again would not result in any change to the output data associated with the computing task. In some examples, output data repository 132 may have faster response times than other types of storage devices among storage devices 112. Thus, output data repository 132 may act as a cache of sorts for other storage devices 112.

In response to determining that output data repository 132 does not store up-to-date output data associated with the computing task ("NO" branch of 300), task performance system 204 may execute the computing task. Otherwise, in response to determining that output data repository 132 stores up-to-date output data associated with the computing task ("YES" branch of 300), proactive processing system 114 may retain the output data associated with the computing task in output data repository 132. In some examples, proactive processing system 114 may update or reset an expiration time for the output data associated with the computing task, such that the output data associated with the computing data may remain stored in output data repository 132.

Proactive processing system 114 may determine, in one of various ways, whether output data repository 132 stores up-to-date output data associated with a computing task. For instance, in one example, task metadata 124 may indicate a schedule on which input data for a computing task is updated. In this example, if the input data for the computing task has not been updated, proactive processing system 114 to not instruct task performance system 204 to perform the computing task. For instance, in this example, the input data for the computing task may only be updated daily, so it would not be productive to perform the computing task more than once per day. In some examples, proactive processing system 114 may determine whether output data repository 132 stores up-to-date output data associated with a computing task based on the output data associated with the computing task being in output data repository 132 for longer than a refresh period of the computing task (e.g., once per day). Proactive processing system 114 may determine the refresh period of the computing task as a difference between times at which users associated with the computing task can be expected to access the output data associated with the computing task. In some examples, proactive processing system 114 may determine the refresh period based on logs indicating when users associated with the computing task accessed the data associated with the computing task.

In the example of FIG. 3, if the output data associated with a computing task is determined not to be up-to-date, task performance system 204 may execute the computing task. When executing the computing task, task performance system 204 may access source data 130. The accessed source data may act as input to the computing tasks. Task performance system 204 may access different source data 130 for different computing tasks. Task performance system 204 may execute a computing task by executing software instructions of one or more computer programs indicated by the task metadata 124 for the computing task. Task performance system 204 may store the output data associated with the computing task in output data repository 132. In some examples, when storing new output data associated with a computing task in output data repository 132, task performance system 204 may replace any existing output data associated with the computing task in output data repository 132 with the new output data associated with the computing task.

Output delivery system 208 implements a process to deliver output data to user devices 104. In the example of FIG. 3, output delivery system 208 may receive an information request 302, e.g., from one of user devices 104 (FIG. 1). Information request 302 comprises a request for the output data associated with a computing task. In response to output delivery system 208 receiving the information request 302, output delivery system 208 may generate a record of information request 302 in user usage data 126. The record may include data indicating a user associated with information request 302, the computing task, and a time associated with information request 302. In this way, proactive processing system 114 builds up data in user usage data 126 that usage prediction system 200 may use to predict when specific users may be expected to access the output data associated with specific computing tasks.

Additionally, in the example of FIG. 3, in response to output delivery system 208 receiving an information request 302 requesting output data associated with a computing task, proactive processing system 114 may determine whether output data repository 132 already stores up-to-date output data associated with the computing task (300). If output data repository 132 already stores up-to-date output data associated with the computing task ("YES" branch of 300), output delivery system 208 may retrieve the output data associated with the computing task from output data repository 132 and deliver the output data associated with the computing task to a user device (e.g., one of user devices 104) that sent information request 302 to output delivery system 208. Thus, if usage prediction system 200 correctly predicted a time at which the user would access the output data associated with the computing task and task performance system 204 executed the computing task as scheduled, the output data associated with the computing task is already stored in output data repository 132 prior to output delivery system 208 receiving an information request 302 from the user to access the output data associated with the computing task.

On the other hand, if proactive processing system 114 determines that output data repository 132 does not store up-to-date output data associated with the computing task ("NO" of 300), proactive processing system 114 may instruct task performance system 204 to perform the computing task. In this way, proactive processing system 114 may perform the computing task in an on-demand or expedited manner if output data repository 132 does not store up-to-date output data associated with the computing task. Task performance system 204 may then store the output data associated with the computing task in output data repository 132. Output delivery system 208 may deliver the output data associated with the computing task to a user device (e.g., one of user devices 104) that sent information request 302 to output delivery system 208. By storing the output data associated with the computing task in output data repository 132, the output data associated with the computing task is available for delivery by output delivery system 208 without re-executing the computing task in the event that output delivery system 208 receives another request for the output data associated with the computing task while the output data associated with the computing task is still up-to-date.

Thus, computing system 102 may receive an information request that requests output data associated with a specific computing task and, in response to the information request, store user usage data 126 that indicates a time associated with the information request. Furthermore, computing system 102 (e.g., output delivery system 208 of computing system 102) may deliver up-to-date output data associated with the specific computing task. The machine learning process may determine, based on user usage data 126, an expected usage time for the specific computing task. In response to the information request, computing system 102 may also determine whether the output data repository stores up-to-date output data associated with the specific computing task. Computing system 102 may deliver the up-to-date output data associated with the specific computing task to a user device in response to determining that the output data repository stores up-to-date output data associated with the specific computing task. Conversely, based on a determination that the output data repository does not store up-to-date output data associated with the specific computing task, computing system 102 may initiate execution of the specific computing task to generate the up-to-date output data associated with the specific computing task.

FIG. 4 is a block diagram illustrating an example operation of task prioritization system 202, in accordance with one or more aspects of this disclosure. In other words, FIG. 4 describes an example process for prioritizing the entries in a task list. The operation of FIG. 4 is presented as an example. Other example operations of task prioritization system 202 may include more, fewer or different actions.

In the example of FIG. 4, task prioritization system 202 may access organization data 128 and a task list 400. As noted elsewhere in this disclosure, organization data 128 includes data describing relationships among people within an organization. Task list 400 may be the task list generated by usage prediction system 200 (FIG. 2, FIG. 3). Entries in task list 400 may specify a computing task, one or more users, and a predicted time when the users are likely to review the output data generated by the computing tasks.

As part of prioritizing the entries in task list 400, task prioritization system 202 may scan through entries in task list 400. For each entry in task list 400, task prioritization system 202 may determine, based on organization data 128, whether a user indicated by a current entry in task list 400 is an influencer (402). In some examples, task prioritization system 202 may determine that a user is an influencer if organization data 128 indicates that a user indicated by the current entry has a specific role within an organization. For example, task prioritization system 202 may determine that a user is an influencer if organization data 128 indicates that the user is a member of a leadership team of the organization (e.g., the CEO, president, manager, etc.). In some examples, task prioritization system 202 may determine that a user is an influencer if a number of steps between the user and a person at a top of an organizational hierarchy of the organization is less than a specific threshold.

If task prioritization system 202 determines that none of the users indicated by the current entry is an influencer ("NO" branch of 402), task prioritization system 202 may determine whether the number of users indicated by the current entry is greater than a threshold (404). In response to determining that the number of users indicated by the current entry is not greater than the threshold ("NO" branch of 404), task prioritization system 202 does not include the current entry in a preliminary list (406). As described below, task prioritization system 202 uses the preliminary list to generate a secondary list that specifies computing tasks to execute. Thus, proactive processing system 114 does not proactively execute the computing task indicated by the current entry. As noted above, task prioritization system 202 may determine whether the number of users indicated by the current entry is greater than a threshold. In some examples, this threshold may be configured by an administrator. In other examples, task prioritization system 202 may automatically adjust the threshold based on one or more heuristics, such as a total number of computing tasks in task list 400, a total number of users indicated by computing tasks in task list 400, or other types of data.

In the example of FIG. 4, in response to determining that a user indicated by the current entry is an influencer ("YES" branch of 402) or in response to determining that the number of users indicated by the current entry is greater than the threshold ("YES" branch of 404), task prioritization system 202 may assign a score to the current entry and include the current entry in the preliminary list (408). Task prioritization system 202 may repeat actions 402, 404, 406, and 408 for some or all of the entries in task list 400.

Task prioritization system 202 may assign the score to the current entry in one of various ways. For instance, in one example, task prioritization system 202 may determine, based on organization data 128, the score for the current entry as a total number of people subordinate in the organization to the users indicated by the current entry. In another example, task prioritization system 202 may determine the score for the current entry based on a weighted combination of factors. In this example, the combination of factors may include one or more of: a total number of people subordinate in the organization to the users indicated by the current entry, a total number of users indicated by the current entry, an expected running time for the computing task indicated by the current entry, an expected size of the output data associated with the computing task indicated by the current entry, a time window in which a user associated with the computing task indicated by the current entry is expected to access the output data associated with the computing task indicated by the current entry, and/or other factors.

For example, Task1, Task2, Task3, Task4 and Task5 are computing tasks scheduled for 03.00 a.m. and computing system 102 can only allocate time for three of these computing tasks. Furthermore, in this example, users associated with the computing tasks may be as follows:
User1: Task1
User2: Task2
User3: Task2
User4: Task3
User5: Task4
User6: Task5
Furthermore, in this example, the influence for the users may be as follows:
User1: 0.9
User2: 0.4
User3: 0.4
User4: 0.6
User5: 0.2
User6: 0.2
Accordingly, in this example, task prioritization system 202 may prioritize the tasks as: Task1, Task2 and Task3. Task1 is ranked first because the combined influence of users associated with Task1 (0.9) is highest of all of the five tasks. Task2 is ranked second because, although Task 2 is associated with two users whose influence is relatively low, the combined influence of the users associated with Task2 (0.8) is the second highest. Task3 is ranked third because the influence of the user associated with Task3 (0.6) because the combined influence of the users associated with Task3 is third highest.

Task prioritization system 202 may generate a secondary task list 412 based on the scores assigned to entries in the preliminary task list (410). For example, as part of generating secondary task list 412, task prioritization system 202 may rank the entries in the preliminary task list based on the scores associated with the entries. Furthermore, in this example, task prioritization system 202 may generate secondary task list 412 by inserting a given number of highest-ranking entries in the preliminary task list into secondary task list 412. Alternatively, task prioritization system 202 may generate secondary task list 412 by removing low-ranking entries from the preliminary task list. This disclosure may also refer to secondary task list 412 as a prioritized task list. Task prioritization system 202 may then schedule execution of the computing tasks in the prioritized task list.

Figure 5:
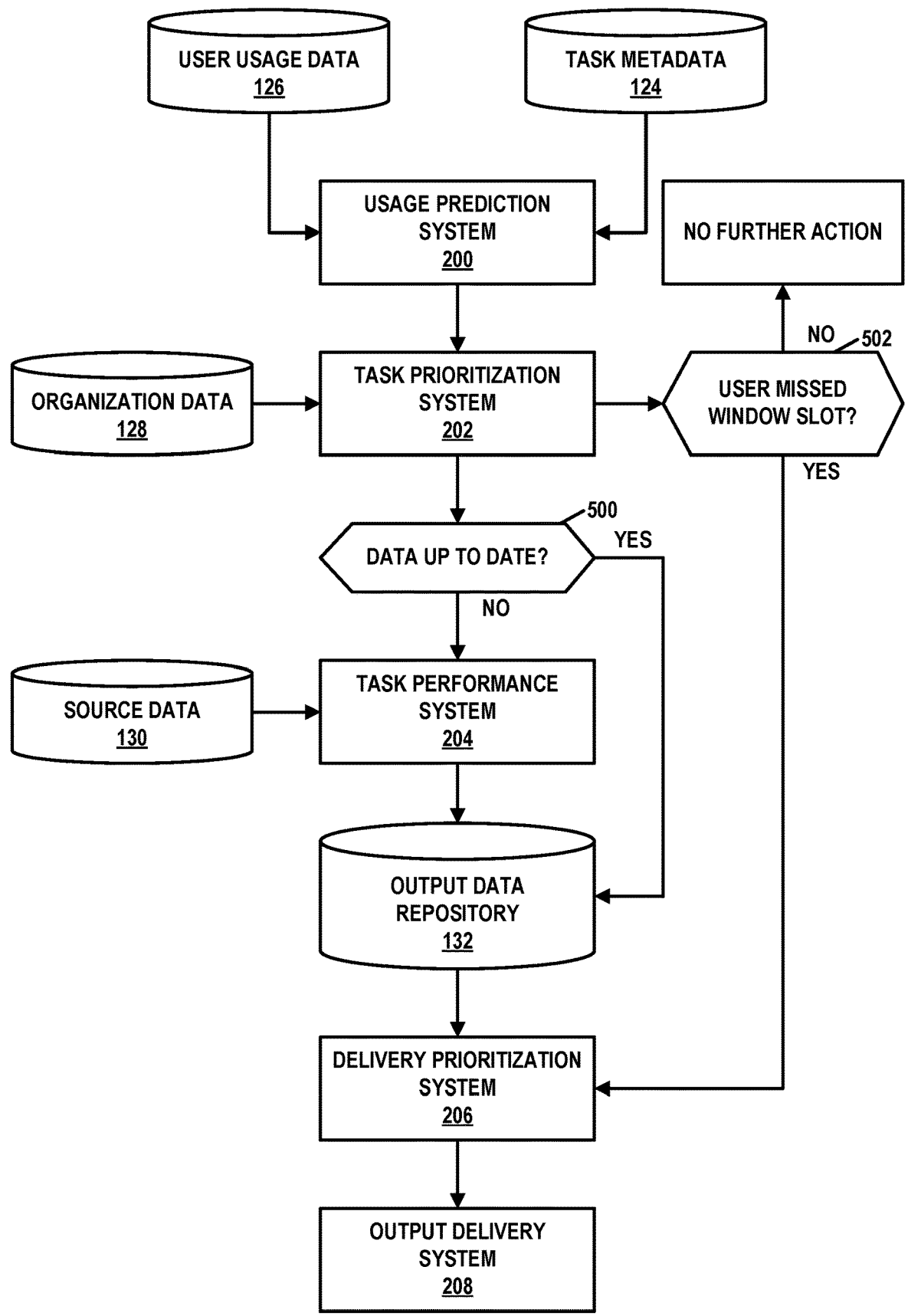
FIG. 5 is a block diagram illustrating an example operation of an assistant system, in accordance with one or more aspects of this disclosure.

FIG. 5 is a conceptual diagram illustrating an example operation of assistant system 116, in accordance with one or more aspects of this disclosure. As noted above, assistant system 116 may detect instances in which proactive processing system 108 predicted that users would access output data generated by specific computing tasks within specific time windows but did not. To proactively provide a user with output data needed for the user's work in cases where the user did not access the output data within a specific time window, assistant system 116 may detect a combination of users, computing tasks, and time windows and may proactively deliver the output data for the users. Once computing system 102 has generated the output data associated with a computing task, assistant system 116 may send notifications to the users associated with the computing task with the output data associate attached.

In the example of FIG. 5, assistant system 116 may use usage prediction system 200 to generate a task list based on task metadata 124 and user usage data 126. Usage prediction system 200 may operate in the same manner as described elsewhere in this disclosure. Additionally, assistant system 116 may use task prioritization system 202 to prioritize entries in the task list generated by usage prediction system 200. Task prioritization system 202 may operate in the same manner as described elsewhere in this disclosure. For instance, as described elsewhere in this disclosure, task prioritization system 202 may use organization data 128 to prioritize the entries in the task list.

Moreover, similar to the operation of proactive processing system 114 in FIG. 3, assistant system 116 may determine whether output data repository 132 stores output data associated with a computing task indicated by an entry in the prioritized task list generated by task prioritization system 202 (500). In the example of FIG. 5, if assistant system 116 determines that output data repository 132 stores such output data ("YES" branch of 500), assistant system 116 may retain the output data associated with the computing task in output data repository 132. Likewise, if assistant system 116 determines that output data repository 132 does not store such output data ("NO" branch of 500), assistant system 116 may use task performance system 204 to execute the computing task. Task performance system 204 may use source data 130 as input to the computing task when executing the computing task. Output data repository 132 may store the output data generated by executing the computing task.

However, as shown in the example of FIG. 5, for each entry in the prioritized task list, assistant system 116 may use delivery prioritization system 206 to determine whether a user indicated by the entry missed a window slot for accessing the output data associated with the computing task indicated by the entry (502). The window slot is a time window that starts at a time that the user can be expected to access the output data associated with the computing task. In some examples, the length of the window slot is a customizable per-user threshold. The user is considered to have missed the window slot for accessing the output data associated with the computing task if the user did not access the output data associated with the computing task within the time window. In the example of FIG. 5, if the user did not miss their window slot for accessing the output data associated with the computing task, delivery prioritization system 206 does not perform any further action with respect to the user.

On the other hand, in response to determining that the user missed their window slot for accessing the output data associated with the computing task ("YES" branch of 502), delivery prioritization system 206 may use output delivery system 208 to send a notification to the user. For example, output delivery system 208 may send an email message or other type of message to the user. The message may include the output data associated with the computing task. In this way, the user may be able to access the output data without sending an information request to output delivery system 208 for the output data.

Figure 6:
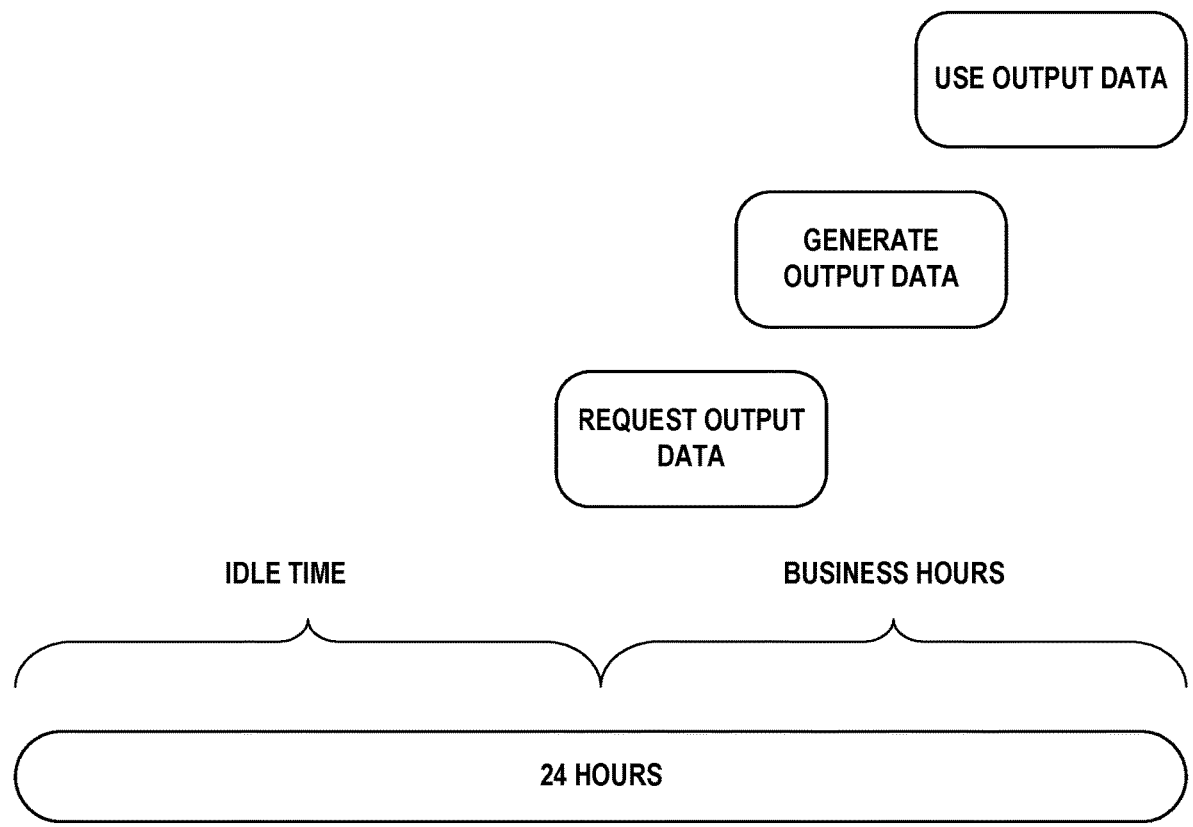
FIG. 6 is a conceptual diagram illustrating an example timeline in which requests for output data occur during business hours.

One of the issues of generating output data for users is a lack of capacity in the computing infrastructure to cover demand for the output data in peak times. The lack of capacity in the computing infrastructure to cover demand for the output data in peak times may result in a situation in which decisions are delayed in order to make the decisions with all the needed output data. To illustrate, consider the example of FIG. 6. FIG. 6 is a conceptual diagram illustrating an example timeline 600 in which a request for output data occurs during business hours. As shown in the example of FIG. 6, a request for output data occurs during business hours. Computing system 102 may then executes a computing task to generate the output data. Subsequently, users may access and use the output data. However, because of the time needed to execute the computing task, the time at which the users are able to access and use the output data may occur significantly later during business hours.

As noted elsewhere in this disclosure, computing system 102 may implement load distributor 118. Load distributor 118 may use data generated by usage prediction system 200 to detect a surge in the demand before the surge in demand hits computing system 102. For instance, usage prediction system 200 may be able to determine a time at which a user can be expected to access the output data associated with a computing task, but, in some examples, usage prediction system 200 does not determine such times to prevent a surge of demand for concurrent processing of computing tasks. For example, usage prediction system 200 may determine that users can be expected to access output data associated with fifty different computing tasks by 8:30 am each weekday.

With an early detection of a surge in the demand for output data, load distributor 118 can distribute idle time of computing system 102 for the execution of computing tasks before the surge of demand arrives. For example, usage prediction system 200 may determine that users can be expected to access output data associated with fifty different computing tasks by 8:30 am each weekday. Accordingly, in this example, rather than attempting to perform all fifty of the computing tasks shortly before 8:30 am each weekday, load distributor 118 may identify idle time in the hours leading up to 8:30 am and use task performance system 204 to execute one or more of the computing tasks during the idle time. For instance, load distributor 118 may identify times of low utilization of computing resources and trigger execution of one or more computing tasks prior to the scheduled execution times of the computing tasks. This redistribution of the workload may decrease the needed to expand the computing resources of computing system 102, while, in some examples, increasing timely availability of output data to senior leadership of an organization.

Figure 7:
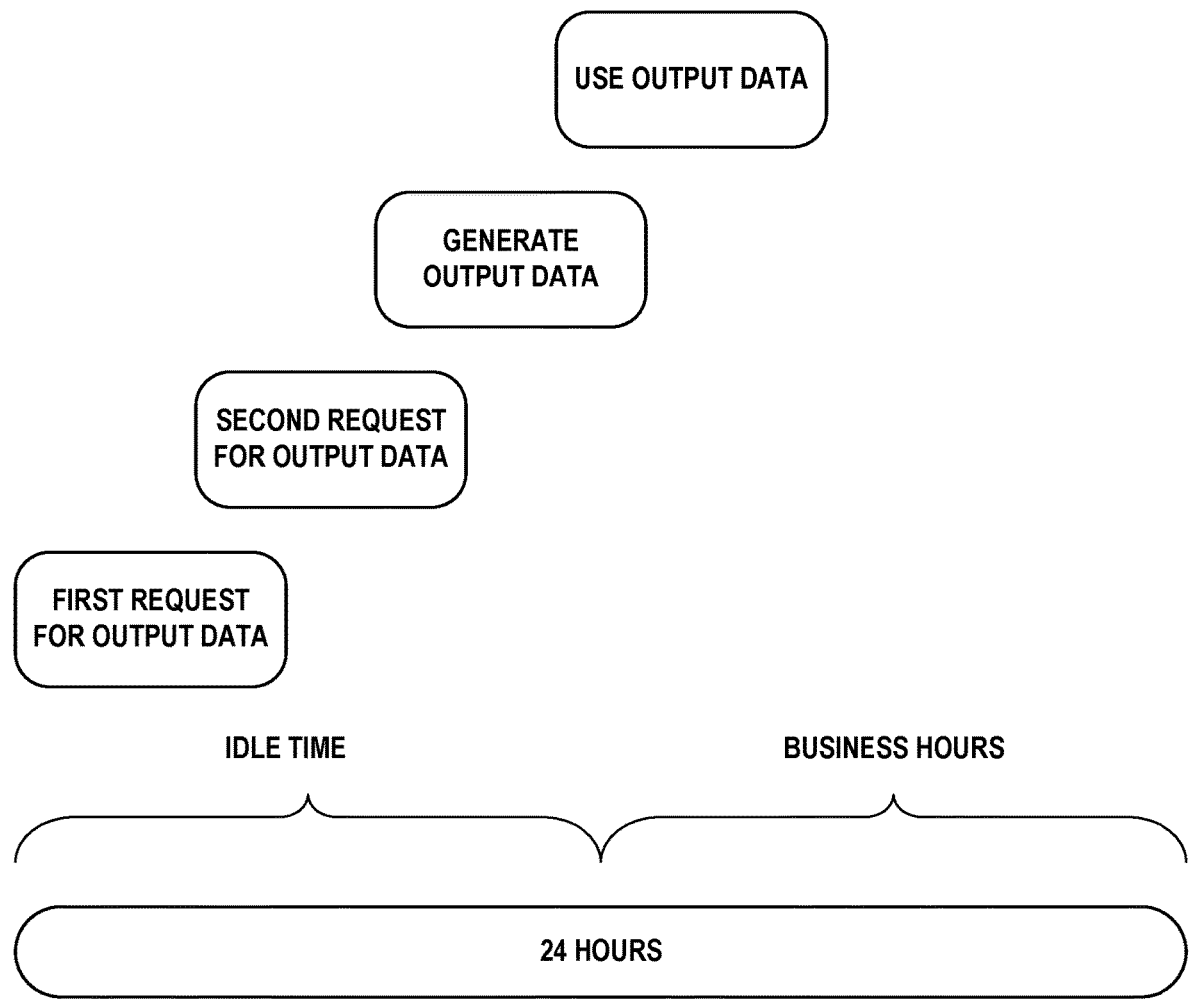
FIG. 7 is a conceptual diagram illustrating an example timeline in which output data may be used within business hours.

FIG. 7 is a conceptual diagram illustrating an example timeline in which output data may be used within business hours. In the example of FIG. 7, computing system 102 may receive a first request for output data and a second request for output data during idle time and computing system 102 may generate output data in response to either or both the first or second requests for output data during the idle time. Accordingly, in contrast to the example of FIG. 6, users may be able to access and use the output data earlier during business hours.

Figure 8:
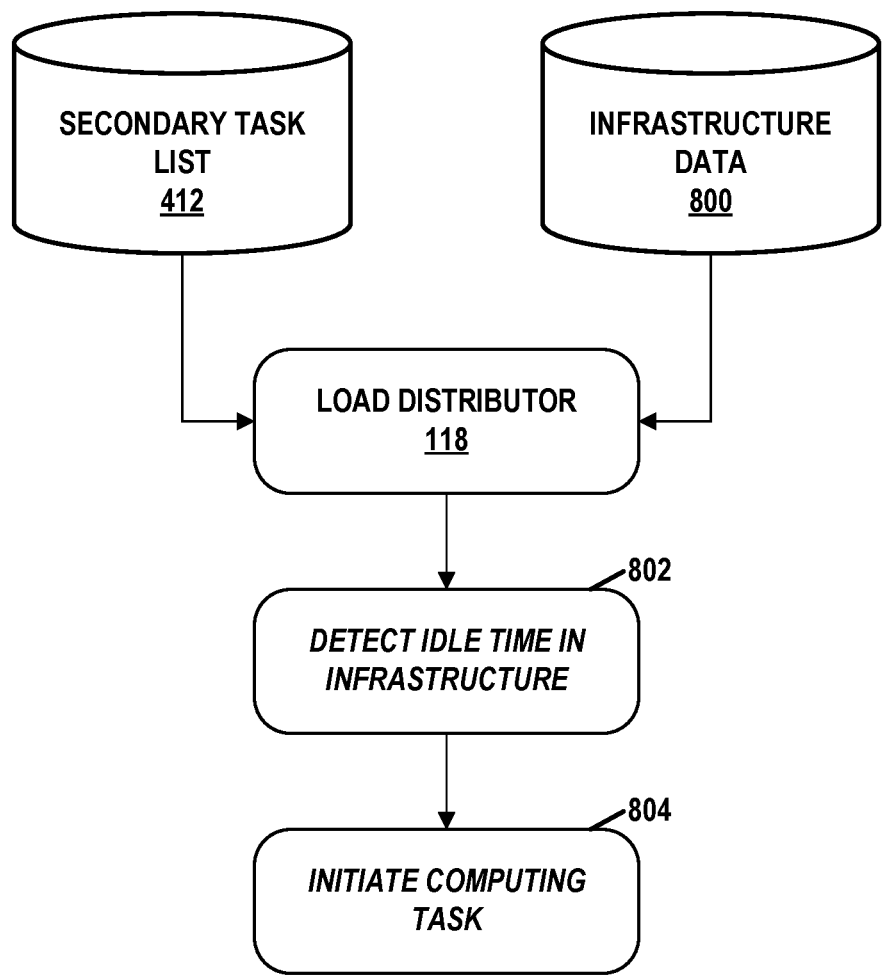
FIG. 8 is a block diagram illustrating an example operation of a load distributor, in accordance within one or more aspects of this disclosure.

FIG. 8 is a block diagram illustrating an example operation of load distributor 118, in accordance within one or more aspects of this disclosure. In the example of FIG. 8, load distributor 118 may access secondary task list 412 (i.e., a prioritized task list) and infrastructure data 800. Although not shown in the example of FIG. 1, storage device(s) 112 may store infrastructure data 800. Infrastructure data 800 may include infrastructure logs and capacity data. The infrastructure logs and capacity data may indicate levels computing resource utilization during previous execution runs of the computing tasks. Additionally, in some examples, the infrastructure logs and capacity data may indicate historical patterns of computing resource utilization. For example, the infrastructure logs and capacity data may indicate levels of processor utilization, levels of random access memory utilization, utilization of network bandwidth, and so on. Infrastructure data 800 may also include data indicating lengths of time historically used to complete execution of computing tasks on the computing infrastructure of computing system 102. Accordingly, in some examples, load distributor 118 may determine an expected time to complete a computing task is an average of the lengths of time historically used to complete execution of the computing task on the computing infrastructure of computing system 102.

Furthermore, in the example of FIG. 8, load distributor 118 may use infrastructure data 800 to detect idle time in the infrastructure of computing system 102 (802). For example, load distributor 118 may analyze infrastructure data 800 to identify times when utilization levels of computing resources of computing system 102 are low enough to perform one or more computing tasks and far enough in advance of the expected usage times for the computing tasks that the expected time of completion of the computing task is before the expected usage times for the computing tasks. Load distributor 118 may then schedule execution of one or more of the computing tasks to occur during the identified times.

For instance, in one example, load distributor 118 may determine, based at least in part on infrastructure data 800, that the utilization levels are sufficiently low between 2:45 am and 3:00 am to perform a specific computing task, given historic utilization levels of the computing resources when performing the computing task. Furthermore, in the example, load distributor 118 may determine that the expected usage time for the computing task is 8:30 am and that the expected time of completion of the computing task is 10 minutes. Accordingly, in this example, load distributor 118 may schedule execution of the computing task to occur between 2:45 am and 3:00 am.

In some examples, computing system 102 may include a set of computing nodes (e.g., 500 computing nodes). In this example, infrastructure data 800 may indicate the number of computing nodes and how many of the computing nodes are in use by other workloads. Furthermore, in this example, based on infrastructure data 800, load distributor 118 may determine that one or more of the computing nodes are available to be allocated for use in performing computing tasks. Accordingly, in this example, load distributor 118 may allocate one or more of the computing nodes for use in performing the computing tasks. In some examples, if load distributor 118 determines that the number of unallocated computing nodes is below a specific threshold (e.g., 50 computing nodes), load distributor 118 may deallocate one or more of the computing nodes to ensure that a sufficient number of the computing nodes is available for other workloads.

When a scheduled time arrives for executing the computing task, load distributor 118 may use task performance system 204 to initiate the computing task (804).

Figure 9:
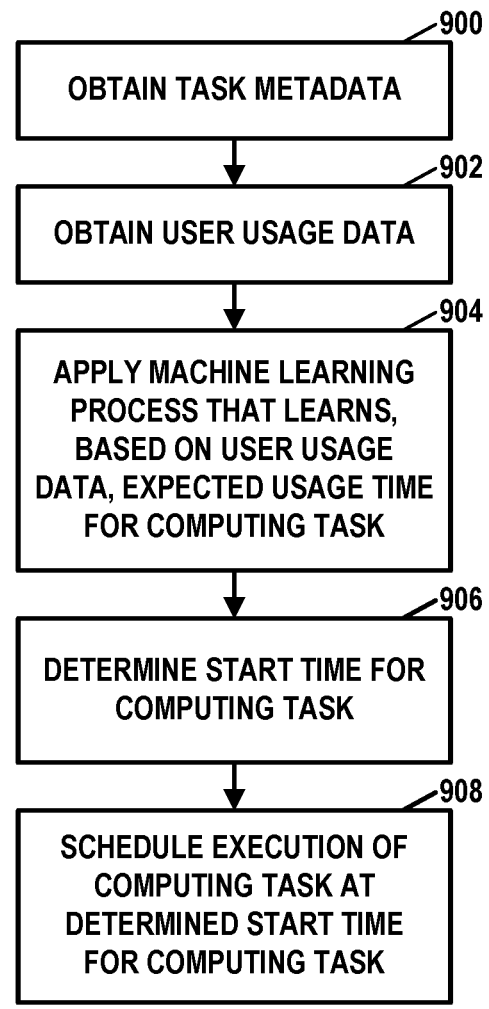
FIG. 9 is a flowchart illustrating an example operation of the computing system, in accordance with one or more aspects of this disclosure.

FIG. 9 is a flowchart illustrating an example operation of computing system 102, in accordance with one or more aspects of this disclosure. The operation of FIG. 9 is presented in an example. In other examples, other operations may include more, fewer, or different actions. For instance, in some examples, actions 900 and 902 may be omitted.

In the example of FIG. 9, computing system 102 may obtain task metadata for one or more computing tasks (900). In typical examples, the one or more computing tasks are a complete set of computing tasks that execute on computing system 102. Rather, the set of computing tasks may only be a selected set of such computing tasks. For each of the computing tasks, the task metadata for the computing task indicates a user associated with the computing task. Additionally, the task metadata for the computing task indicates one or more computer programs to execute the computing task. Execution of the computing task generates output data associated with the computing task.

Furthermore, in the example of FIG. 9, for each of the computing tasks, computing system 102 (e.g., usage prediction system 200) may obtain user usage data for the computing task (902). The user usage data for the computing task includes data that indicate one or more times at which the user associated with the computing task accesses the output data associated with the computing task. The user usage data 126 for the computing task includes data that indicate one or more times at which the user associated with the computing task accesses the output data associated with the computing task.

Computing system 102 (e.g., usage prediction system 200) may apply a machine learning process that determines an expected usage time for the output data associated with the computing task (904). The expected usage time for the computing task is a time at which the user associated with the computing task can be expected to access the output data associated with the computing task. The machine learning process may determine, based on the user usage data for the computing task, the expected usage time for the output data associated with the computing task.

Furthermore, computing system 102 (e.g., proactive processing system 114, assistant system 116, or load distributor 118 of computing system 102) may determine a start time for the computing task that is prior to the expected usage time for the computing task by at least an expected running time of the computing task (906). For instance, computing system 102 may determine an expected running time for the computing task and determine the start time for the computing task from among times that are before the expected usage time for the computing task minus the expected running time for the computing task. To determine the expected running time of the computing task, computing system 102 may determine an average of the lengths of time historically used to complete execution of the computing task on the computing infrastructure of computing system 102. In other examples, computing system 102 may determine the expected running time of the computing task by extrapolating a running time of the computing task based on lengths of time historically used to complete execution of the computing task on the computing infrastructure of computing system 102. In some examples, computing system 102 schedules execution of the computing task during idle time before the expected usage time for the computing task, as described elsewhere in this disclosure.

In the example of FIG. 9, computing system 102 may schedule execution of the computing task at the determined start time for the computing task (906). For example, computing system 102 may generate data indicating the determine start time for the computing task that computing system 102 may subsequently use to determine when to start execution of computing tasks.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

Example 1

A method of scheduling a plurality of computing tasks for performance by a computing system, the method comprising: for each computing task of the plurality of computing tasks: applying, by the computing system, a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determining, by the computing system, a start time for the computing task that is prior to the expected usage time for the computing task by at least an expected running time of the computing task; and scheduling, by the computing system, execution of one or more of the computing tasks at the determined start times for the computing tasks.

Example 2

The method of example 1, wherein: the method further comprises, for each computing task of the plurality of computing tasks: obtaining, by the computing system, user usage data for the computing task, wherein the user usage data for the computing task includes data that indicates one or more times at which the user associated with the computing task accesses the output data associated with the computing task; and determining, by the computing system, based on the user usage data, whether or not to schedule the execution of the computing task.

Example 3

The method of any of examples 1-2, wherein the method further comprises: obtaining, by the computing system, task metadata for the plurality of computing tasks, wherein, for each of the computing tasks: the task metadata for the computing task indicates a user associated with the computing task, and the task metadata for the computing task indicates one or more computer programs to execute the computing task.

Example 4

The method of any of examples 1-3, wherein the method further comprises, for each computing task of the plurality of computing tasks: obtaining, by the computing system, user usage data for the computing task, wherein the user usage data for the computing task includes data that indicate one or more times at which the user associated with the computing task accesses the output data associated with the computing task, and wherein applying the machine learning process comprises applying, by the computing system, the machine learning process that determines, based on the user usage data for the computing task, the expected usage time for the output data associated with the computing task.

Example 5

The method of any of examples 1-4, wherein: the plurality of computing tasks includes a specific computing task, the method further comprises: receiving, by the computing system, an information request that requests output data associated with the specific computing task; in response to the information request: storing, by the computing system, user usage data that indicates a time associated with the information request; and delivering, by the computing system, up-to-date output data associated with the specific computing task, and applying the machine learning process comprises applying the machine learning process to determine, based on the user usage data, an expected usage time for the specific computing task.

Example 6

The method of example 5, wherein the method further comprises: for each computing task of the plurality of computing tasks, storing, by the computing system, the output data associated with the computing task in an output data repository; in response to the information request, determining, by the computing system, whether the output data repository stores up-to-date output data associated with the specific computing task; and delivering, by the computing system, the up-to-date output data associated with the specific computing task to a user device in response to determining that the output data repository stores up-to-date output data associated with the specific computing task.

Example 7

The method of any of examples 5 and 6, wherein the method further comprises: for each computing task of the plurality of computing tasks, storing, by the computing system, the output data associated with the computing task in an output data repository; in response to the information request, determining, by the computing system, whether the output data repository stores up-to-date output data associated with the specific computing task; and based on a determination that the output data repository does not store up-to-date output data associated with the specific computing task, initiating, by the computing system, execution of the specific computing task to generate the up-to-date output data associated with the specific computing task.

Example 8

The method of any of examples 1-7, wherein the plurality of computing tasks includes a specific computing task and applying the machine learning process comprises applying, by the computing system, an artificial neural network that outputs the expected usage time for the output data associated with the specific computing task.

Example 9

The method of any of examples 1-8, wherein input to the machine learning process includes one or more of: data indicating the specific computing task of the plurality of computing tasks, data indicating a job title of a user, data indicating a workplace location of the user, data indicating a current time zone or location of the user, data indicating a number of users associated with the specific computing task, data indicating a volume of data generated by the specific computing task, or data indicating a number of people subordinate to the user.

Example 10

The method of any of examples 1-9, wherein: the method further comprises generating, by the computing system, a filtered list of one or more of the computing tasks based on roles of users associated with the computing tasks, wherein the filtered list includes fewer than all of the computing tasks, and scheduling execution of the one or more computing tasks comprises scheduling execution of the computing tasks in the filtered list.

Example 11

A computing system comprising: one or more processing circuits configured to: for each computing task of a plurality of computing tasks: apply a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determine a start time for the computing task that is prior to the expected usage time for the computing task by at least an expected running time of the computing task; and schedule execution of one or more of the computing tasks at the determined start times for the computing tasks; and one or more storage devices configured to store an output data repository that includes output data associated with the one or more computing tasks.

Example 12

The computing system of example 11, wherein: the one or more processing circuits are further configured to, for each of the computing tasks: obtain user usage data for the computing task, wherein the user usage data for the computing task includes data that indicate one or more times at which the user associated with the computing task accesses the output data associated with the computing task; determine, based on the user usage data, whether or not to schedule the execution of the computing task; schedule the execution of the computing task based on a determination to schedule the execution of the computing task, and not schedule the execution of the computing task based on a determination not to schedule execution of the computing task.

Example 13

The computing system of any of examples 11-12, wherein the one or more processing circuits are further configured to: obtain task metadata for the plurality of computing tasks, wherein, for each of the computing tasks: the task metadata for the computing task indicates a user associated with the computing task, the task metadata for the computing task indicates one or more computer programs to execute the computing task.

Example 14

The computing system of any of examples 11-13, wherein: the one or more processing circuits are further configured to, for each computing task of the plurality of computing tasks obtain user usage data for the computing task, wherein the user usage data for the computing task includes data that indicate one or more times at which the user associated with the computing task accesses the output data associated with the computing task, and the machine learning process determines, based on the user usage data for the computing task, the expected usage time for the output data associated with the computing task.

Example 15

The computing system of any of examples 11-14, wherein: the plurality of computing tasks includes a specific computing task, the one or more processing circuits are further configured to: receive an information request that requests output data associated with the specific computing task; in response to the information request: store user usage data that indicates a time associated with the information request; and deliver up-to-date output data associated with the specific computing task, and the machine learning process determines, based on the user usage data, an expected usage time for the specific computing task.

Example 16

The computing system of example 15, wherein: the one or more storage devices are further configured to store output data associated with the specific computing task in the output data repository, and the one or more processing circuits are further configured to: in response to the information request, determine whether the output data repository stores up-to-date output data associated with the specific computing task; deliver the up-to-date output data associated with the specific computing task to a user device in response to determining that the output data repository stores up-to-date output data associated with the specific computing task; and based on a determination that the output data repository does not store up-to-date output data associated with the specific computing task, initiate execution of the specific computing task to generate the up-to-date output data associated with the specific computing task.

Example 17

The computing system of any of examples 11-16, wherein the plurality of computing tasks includes a specific computing task and the one or more processing circuits are configured such that, as part of applying the machine learning process to determine the expected usage times for the output data associated with the computing tasks, the one or more processing circuits apply an artificial neural network that outputs an expected usage time for output data associated with the specific computing task.

Example 18

The computing system of any of examples 11-17, wherein input to the machine learning process includes one or more of: data indicating a specific computing task of the plurality of computing tasks, data indicating a job title of a user, data indicating a workplace location of the user, data indicating a current time zone or location of the user, data indicating a number of users associated with the computing task, data indicating a volume of data generated by the specific computing task, or data indicating a number of people subordinate to the user.

Example 19

The computing system of any of examples 11-18, wherein: the one or more processing circuits are further configured to generate a filtered list of one or more of the computing tasks based on roles of users associated with the computing tasks, wherein the filtered list includes fewer than all of the computing tasks, and the one or more processing circuits are configured such that, as part of scheduling execution of the one or more computing tasks, the one or more processing circuits schedule execution of the computing tasks in the filtered list.

Example 20

A computer-readable data storage medium having instructions stored thereon that, when executed cause a computing system to: for each computing task of a plurality of computing tasks: apply a machine learning process that determines an expected usage time for output data associated with the computing task, wherein execution of the computing task generates the output data associated with the computing task, and the expected usage time for the output data associated with the computing task is a time at which a user associated with the computing task can be expected to access the output data associated with the computing task; and determine a start time for the computing task that is prior to the expected usage time for the computing task by at least an expected running time of the computing task; and schedule execution of one or more of the computing tasks at the determined start times for the computing tasks.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including server devices, wireless handsets, integrated circuit s(IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of scheduling a plurality of computing tasks for performance by a computing system, the method comprising:

obtaining, by the computing system, task metadata for the plurality of computing tasks, wherein, for each of the plurality of computing tasks, the task metadata for the computing task indicates a user associated with the computing task and one or more computer programs to execute the computing task;

for each computing task of the plurality of computing tasks:

obtaining, by the computing system, user usage data for the computing task, wherein the user usage data for the computing task includes data indicating one or more times at which the user associated with the computing task accesses the output data associated with the computing task;

applying, by the computing system, a machine learning process that determines an expected usage time for output data associated with the computing task based on the user usage data and the task metadata for the computing task, wherein execution of the computing task generates the output data associated with the computing task, wherein the expected usage time for the output data associated with the computing task is a time at which the user associated with the computing task can be expected to access the output data associated with the computing task;

determining, by the computing system, a start time for the computing task that is prior to the expected usage time for the computing task by at least an expected running time of the computing task; and determining, by the computing system, a score for the computing task based on a position of the user in an organization;

generating a list of the plurality of computing tasks basing on the scores of the plurality of computing tasks; and scheduling execution of one or more of the plurality of computing tasks based at least in part on an order of the one or more of the plurality of computing tasks in the list and the start times of the one or more of the plurality of computing tasks.

2. The method of claim 1, wherein:

the method further comprises, for each computing task of the plurality of computing tasks:

obtaining, by the computing system, the user usage data for the computing task; and determining, by the computing system, based on the user usage data for the computing task, whether or not to schedule the execution of the computing task.

3. The method of claim 1, wherein:

the plurality of computing tasks includes a specific computing task, the method further comprises:

receiving, by the computing system, an information request that requests output data associated with the specific computing task;

in response to the information request:

storing, by the computing system, user usage data that indicates a time associated with the information request; and delivering, by the computing system, up-to-date output data associated with the specific computing task, and applying the machine learning process comprises applying the machine learning process to determine, based on the user usage data that indicates the time associated with the information request, an expected usage time for the specific computing task.

4. The method of claim 3, wherein the method further comprises:

for each computing task of the plurality of computing tasks, storing, by the computing system, the output data associated with the computing task in an output data repository;

in response to the information request, determining, by the computing system, whether the output data repository stores up-to-date output data associated with the specific computing task; and delivering, by the computing system, the up-to-date output data associated with the specific computing task to a user device in response to determining that the output data repository stores the up-to-date output data associated with the specific computing task.

5. The method of claim 3, wherein the method further comprises:

for each computing task of the plurality of computing tasks, storing, by the computing system, the output data associated with the computing task in an output data repository;

in response to the information request, determining, by the computing system, whether the output data repository stores up-to-date output data associated with the specific computing task; and based on a determination that the output data repository does not store the up-to-date output data associated with the specific computing task, initiating, by the computing system, execution of the specific computing task to generate the up-to-date output data associated with the specific computing task.

6. The method of claim 1, wherein the plurality of computing tasks includes a specific computing task and applying the machine learning process comprises applying, by the computing system, an artificial neural network that outputs the expected usage time for the output data associated with the specific computing task.

7. The method of claim 6, wherein input to the machine learning process includes one or more of: data indicating the specific computing task of the plurality of computing tasks, data indicating a job title of the user, data indicating a workplace location of the user, data indicating a current time zone or location of the user, data indicating a number of users associated with the specific computing task, data indicating a volume of data generated by the specific computing task, or data indicating a number of people subordinate to the user.

8. The method of claim 1, further comprising:

detecting, by the computing system, an upcoming surge in demand for concurrent processing of the computing tasks; and scheduling, by the computing system, the execution of the one or more of the plurality of computing tasks during one or more idle periods of the computing system, wherein for each respective computing tasks of the one or more of the plurality of computing tasks, the schedule idle period precedes the expected usage time of the respective computing tasks and the detecting upcoming surge in demand by at least the start time of the respective computing task.

9. A computing system comprising:

one or more processing circuits configured to:

obtain task metadata for a plurality of computing tasks, wherein, for each of the plurality of computing tasks, the task metadata for the computing task indicates a user associated with the computing task and one or more computer programs to execute the computing task;

for each computing task of the plurality of computing tasks:

obtain user usage data for the computing task, wherein the user usage data for the computing task includes data indicating one or more times at which the user associated with the computing task accesses the output data associated with the computing task;

apply a machine learning process that determines an expected usage time for output data associated with the computing task based on the user usage data and the task metadata for the computing task, wherein execution of the computing task generates the output data associated with the computing task, wherein the expected usage time for the output data associated with the computing task is a time at which the user associated with the computing task can be expected to access the output data associated with the computing task;

determine a start time for the computing task that is prior to the expected usage time for the computing task by at least an expected running time of the computing task; and determine a score for the computing task based on a position of the user in an organization;

generate a list of the plurality of computing tasks based on the scores of the plurality of computing tasks; and schedule execution of one or more of the plurality of computing tasks based at least in part on an order of the one or more of the plurality of computing tasks in the list and the start times of the one or more of the plurality of computing tasks; and one or more storage devices configured to store an output data repository that includes output data associated with the one or more computing tasks.

10. The computing system of claim 9, wherein:

the one or more processing circuits are further configured to, for each of the computing tasks:

obtain the user usage data for the computing task;

determine, based on the user usage data, whether or not to schedule the execution of the computing task;

schedule the execution of the computing task based on a determination to schedule the execution of the computing task; and not schedule the execution of the computing task based on a determination not to schedule execution of the computing task.

11. The computing system of claim 9, wherein:

the plurality of computing tasks includes a specific computing task, the one or more processing circuits are further configured to:

receive an information request that requests output data associated with the specific computing task;

in response to the information request:

store user usage data that indicates a time associated with the information request; and deliver up-to-date output data associated with the specific computing task, and the machine learning process determines, based on the user usage data that indicates the time associated with the information request, an expected usage time for the specific computing task.

12. The computing system of claim 11, wherein:

the one or more storage devices are further configured to store output data associated with the specific computing task in the output data repository, and the one or more processing circuits are further configured to:

in response to the information request, determine whether the output data repository stores up-to-date output data associated with the specific computing task;

deliver the up-to-date output data associated with the specific computing task to a user device in response to determining that the output data repository stores the up-to-date output data associated with the specific computing task; and based on a determination that the output data repository does not store the up-to-date output data associated with the specific computing task, initiate execution of the specific computing task to generate the up-to-date output data associated with the specific computing task.

13. The computing system of claim 9, wherein the plurality of computing tasks includes a specific computing task and the one or more processing circuits are configured such that, as part of applying the machine learning process to determine the expected usage times for the output data associated with the computing tasks, the one or more processing circuits apply an artificial neural network that outputs an expected usage time for output data associated with the specific computing task.

14. The computing system of claim 9, wherein input to the machine learning process includes one or more of: data indicating a specific computing task of the plurality of computing tasks, data indicating a job title of the user, data indicating a workplace location of the user, data indicating a current time zone or location of the user, data indicating a number of users associated with the computing task, data indicating a volume of data generated by the specific computing task, or data indicating a number of people subordinate to the user.

15. The system of claim 9, wherein the one or more processing circuits is further configured to:

detect an upcoming surge in demand for concurrent processing of the computing tasks; and schedule the execution of the one or more of the plurality of computing tasks during one or more idle periods of the computing system, wherein for each respective computing task of the one or more of the plurality of computing tasks, the scheduled idle period precedes the expected usage time of the respective computing task and the detected upcoming surge in demand by at least the start time of the respective computing task.

16. A non-transitory computer-readable data storage medium having instructions stored thereon that, when executed cause a computing system to:

obtain task metadata for a plurality of computing tasks, wherein for each of the plurality of computing tasks, the task metadata for the computing task indicates a user associated with the computing task and one or more computer programs to execute the computing task;

for each computing task of the plurality of computing tasks:

obtain user usage data for the computing task, wherein the user usage data for the computing task includes data indicating one or more times at which the user associated with the computing task accesses the output data associated with the computing task;

apply a machine learning process that determines an expected usage time for output data associated with the computing task based on the user usage data and the task metadata for the computing task, wherein execution of the computing task generates the output data associated with the computing task, wherein the expected usage time for the output data associated with the computing task is a time at which the user associated with the computing task can be expected to access the output data associated with the computing task;

determine a start time for the computing task that is prior to the expected usage time for the computing task by at least an expected running time of the computing task; and determine a score for the computing task based on a position of the user in an organization;

generate a list of the plurality of computing tasks based on the scores of the plurality of computing tasks; and schedule execution of one or more of the plurality of computing tasks based at least in part on an order of the one or more of the plurality of computing tasks in the list and the start times of the one or more of the plurality of computing tasks.

\* \* \* \* \*